US012129978B1

(12) United States Patent
Hunsaker

(10) Patent No.: US 12,129,978 B1
(45) **Date of Patent: *Oct. 29, 2024**

(54) SIZE ADJUSTABLE LIGHT EMITTING DIODE LIGHT SYSTEM WITH THREE LIGHT PROJECTION PLANES

(71) Applicant: LOGO DESIGN GROUP, LLC, Phoenix, AZ (US)

(72) Inventor: Drew J. Hunsaker, Phoenix, AZ (US)

(73) Assignee: LOGO DESIGN GROUP, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,545

(22) Filed: Nov. 27, 2023

Related U.S. Application Data

(63) Continuation of application No. 18/241,831, filed on Sep. 1, 2023, now Pat. No. 11,835,190.

(51) Int. Cl.
*F21S 4/20* (2016.01)
*F21Y 103/00* (2016.01)
*F21Y 115/10* (2016.01)

(52) U.S. Cl.
CPC ............ *F21S 4/20* (2016.01); *F21Y 2103/00* (2013.01); *F21Y 2115/10* (2016.08)

(58) Field of Classification Search
CPC ........ F21S 4/20; F21S 4/00; F21S 4/22; F21S 4/28; F21Y 2115/10; F21Y 2103/00; F21V 15/00; F21V 15/01; F21V 15/012; F21V 15/013; F21V 21/00; F21V 21/02; F21V 23/003; F21V 23/004; F21V 23/005
See application file for complete search history.

(56) References Cited

U.S. PATENT DOCUMENTS

| | | | | |
|---|---|---|---|---|
| 4,994,944 | A | 2/1991 | Vernondier | |
| 5,430,627 | A | 7/1995 | Nagano | |
| 5,499,170 | A | 3/1996 | Gagne | |
| 6,561,690 | B2 | 5/2003 | Balestriero et al. | |
| 7,331,689 | B2 | 2/2008 | Chen | |
| 8,099,886 | B2 | 1/2012 | Ellerton | |
| 8,702,265 | B2 | 4/2014 | May | |
| 8,884,786 | B2 | 11/2014 | Beukema et al. | |
| 11,647,574 | B2 | 5/2023 | Avery, Jr. | |
| 11,835,190 | B1 * | 12/2023 | Hunsaker | F21V 7/005 |
| 2011/0273877 | A1 | 11/2011 | Reed et al. | |
| 2017/0038037 | A1 | 2/2017 | Sutherland | |

* cited by examiner

*Primary Examiner* — Bao Q Truong
(74) *Attorney, Agent, or Firm* — Invention To Patent Services; Alex Hobson

(57) ABSTRACT

A size adjustable LED light system has a first and second light retainer that are configured as mirror images to retain a front LED light strip of variable heights and lengths. Also, each of the first and second light retainer form a side LED light receiver channel configured to receive a side LED light. The front extensions of each of the light retainers create a barrier between the front LED light strip and the side LED light, to enable different colors of light to be projected from the front and the two sides. The first and second light retainers have front panel channel for retaining a front panel of the front LED light strip and side panel channels for retaining a side panel over the respective side LED light or side LED light panel.

19 Claims, 7 Drawing Sheets

SIZE ADJUSTABLE LIGHT EMITTING DIODE LIGHT SYSTEM WITH THREE LIGHT PROJECTION PLANES

CROSS REFERENCE TO RELATED APPLICATIONS

This application is a continuation of U.S. patent application Ser. No. 18/241,831, filed on Sep. 1, 2023 and currently pending; the entirety of which is hereby incorporated by reference herein.

BACKGROUND OF THE INVENTION

Field of the Invention

The invention relates to a size adjustable light emitting diode light system having two separate light retainers configured to couple with a front light emitting diode light strip of variable height and of variable length.

Background

Light emitting diode (LED) lights have greatly expanded lighting system versatility as a plurality of LED lights can be configured on a strip and this strip can be cut to a desired length. Also, one or more rows of LED lights may be configured on a LED light strip to provide variations in light intensity and size of illuminated area. Also, LED lights can be various colors which enables a user to select a desired color according to a particular preference.

Lighting systems for retaining the LED light strips typically have a fixed dimension and fixed location for placement of the LED light strip. Therefore, a particular size is required for each different desired light system. Also, some light retainers enable two or more light strips to be used, however, the projected light is mixed in these systems and therefore, lights of different colors are mixed.

SUMMARY OF THE INVENTION

The invention is directed to a size adjustable LED light system that has a first and second light retainer that are configured to retain a front LED light strip of variable heights and lengths. Also, each of the first and second light retainer form a side LED light receiver channel configured to receive a side LED light. The front extensions of each of the first and second light retainers create a barrier between the front LED light strip and the side LED light, to enable different colors of light to be projected from the front and one or both of the two sides. The length of the size adjustable LED light may be adjusted by cutting the first and second LED light retainers to a desired length. The first and second light retainers have front panel channel for retaining a front panel of the front LED light strip and side panel channels for retaining a side panel over the respective side LED light or side LED light panel.

The first and second light retainers may be geometrically the same and may be oriented as mirror images across a centerline of the size adjustable LED light and on either side of the front LED light strip. Each light retainer has a front panel channel for receiving opposing ends of the front LED light strip. Each light retainer has a front extension that extends to an extended end having front panel channel and a side panel channel. Also, each light retainer has a base extension that extends to an extended end having a side panel channel. A front translucent panel is configured to extend between the front panel channels of the two light retainers and cover the front LED light strip. A first side panel is configured for insertion in the side panel channel of the front extension and the side panel channel of the base extension, of the first light retainer. Likewise, a second side panel is configured for insertion in the side panel channel of the front extension and the side panel channel of the base extension, of the second light retainer.

A side LED light receiver channel is configured between the front extension and the base extension of each of the first and second light retainers and separates a side LED light from light projects from the front LED light. The front extension may be opaque and prevent light from the side LED light from passing therethrough. Therefore, the front LED light projects a light out of the front of the size adjustable LED light, between the two front extensions, which may be a first color, and a side LED light projects light out of a side of the size adjustable LED light, which may be a second color that is different from the front LED light and/or a second side LED light. In this way, a three color light arrangement can be produced with the size adjustable LED light system.

The front panel as well as the first and/or second side panels are translucent to enable the light to pass therethrough and may include variations in translucency to produce a design such as text projected by the light. A film or coating may be configured over a portion of the panels to produce the design or text or message. Also, a front or side panel may be a color that changes the color of the light as it passes therethrough. The LED lights may be controlled to be a different color and may be configured to produce a design or text or message in a fixed or static manner or controlled to turn on and off to produce a dynamic design or text or message, such as a ticker type light that has a streaming message along the length of the light.

The base extension is configured to extend to the base side of the size adjustable LED light and may have an aperture to receive a base retainer, such as a screw to secure the size adjustable LED light to a base, such as a wall, ceiling, floor, post and the like. One or more stand-offs may extend from the base extension toward or to a base side of the size adjustable LED light to provide additional support of the size adjustable LED light to the base.

The side LED light receiver channel is configured between the base extension and the front extension and a channel extension may be configured for receiving the side LED light or side LED light strip. The channel extension may extend between the connected end of the front extension and/or the base extension and may be a planar surface for mounting the side LED light strip. The channel extension may be configured at a channel extension offset angle to direct light from the side LED light slightly toward the front side of the size adjustable LED light to prevent hot spots on a base surface or wall, and to provide more intense projection of light forward from the size adjustable LED light. The side LED light strip may include one or more LED lights or light rows configured between the front extension and the base extension.

A front LED light strip of any height, distance between the first end and second end, may be configured in and between the two front LED light strip channels of the first and second light retainer. This enables a size adjustable LED light that can be adjusted in height. The front LED light strip may have one, two or more, three or more, five or more, or event ten or more lights or light rows configured between the first end and second end of the front LED light strip. The front extensions may extend at an extension angle from a base plane, the plane along the base side of the size adjustable LED light or between the two extended ends of the base extensions, of about 35 degrees or more, about 45 degrees or more, about 60 degrees or more, about 75 degrees or less and any range between and including the values provided. The front LET light channel, the space between the two front extensions, tapers from the extended ends of the front extensions to the front LED light strip channel to provide an expanding housing for the front LED light.

A wiring channel is configured between the base extension, the front LED light strip and the base, such as a wall surface. Wiring may extend within this wiring channel and provide power to the front LED light strip and front LED lights and also to the first and/or second side LED light or lights. An aperture may be configured in the first and/or second light retainer to enable the wire to extend therethrough to provide power to the side LED lights.

The size adjustable LED light system enables assembly of a size adjustable LED light of various heights from a first side to a second side by retaining various height front LED light strips. The height of the size adjustable LED light may be about 50 mm or more, about 75 mm or more, about 100 mm or more, about 150 mm or more, about 200 mm or more, about 250 mm or more, about 300 mm or more, about 400 mm or more and any range between and including the height values provided The depth of the size adjustable LED light is the distance from the front panel to the extended end of the base extensions or the base measured along the centerline. The depth may be about 50 mm or more, about 75 mm or more, about 100 mm or more, about 150 mm or more, about 200 mm or more and any range between and including the depth values provided. Also, the size adjustable LED light system enables assembly of a size adjustable LED light of various lengths from a first end to a second end of the first and second. The length may be 25 mm or 50 mm to very long. The first and second light retainers may be made of a material that is flexible, such as plastic to enable the size adjustable LED light to bend and flex around curved base surfaces or to be configured in an arc or connected ring. The first and second light retainers may have flexible features included to further promote and enable flexibility, such as slits or cuts into portions of the panel channels including the side and front panel channels.

In an exemplary embodiment, the size adjustable LED light may be configured to extend at angles wherein a first portion of the size adjustable LED light extending along a first axis and a second portion of the size adjustable LED light extends at an angle to the first portion. The two portions may be coupled together by an angle connector or end plate, for example or may be directly coupled together.

The first and second light retainers may be made out of suitable materials for retaining size adjustable LED light strips, such as plastic or metal, or composite materials. The size adjustable LED light may utilize light retainers consisting of the first and second light retainers that are the same extruded light-race configured as mirror images across the front LED light strip.

The size adjustable LED light is configured to project light in one, two or three planes or axes. The front LED light strip projects light through the front panel and along the front light projection axis or plane. The first side LED light strip and first side LED light projects light through the first side panel and along a first side projection axis or plane. The second side LED light strip and second side LED light projects light through the second side panel and along a second side projection axis or plane. The first side projection axis or plane and second side projection axis or plane may be substantially orthogonal to the front light projection axis or plane, or within about 10 degrees or less, or even about 5 degrees or less of orthogonal. The first side projection axis or plane and second side projection axis or plane may be opposite each other, wherein light projected from the first side LED light is directed in an opposite direction from the second side LED light.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
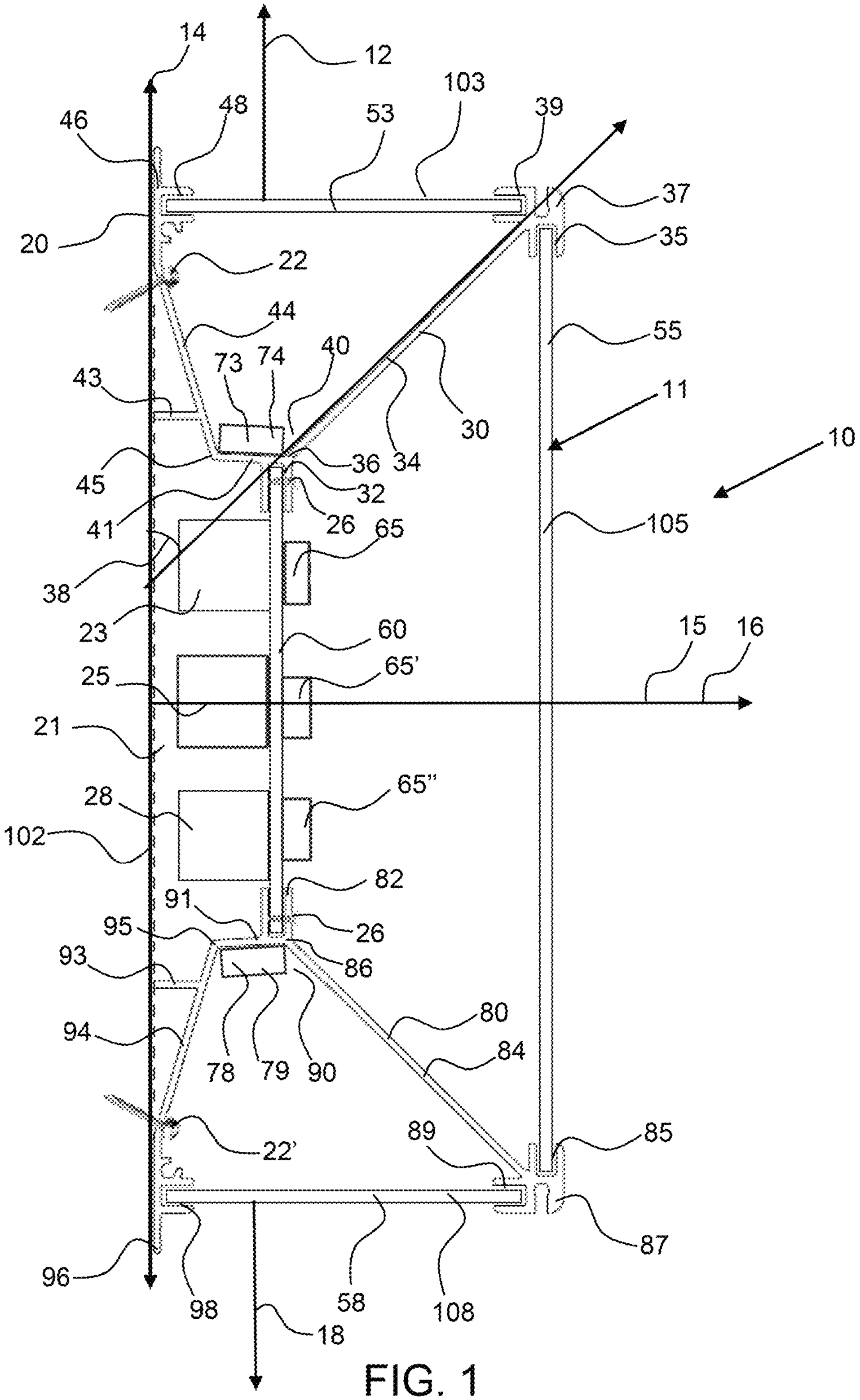
FIG. 1 shows a side view of a size adjustable LED light system.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
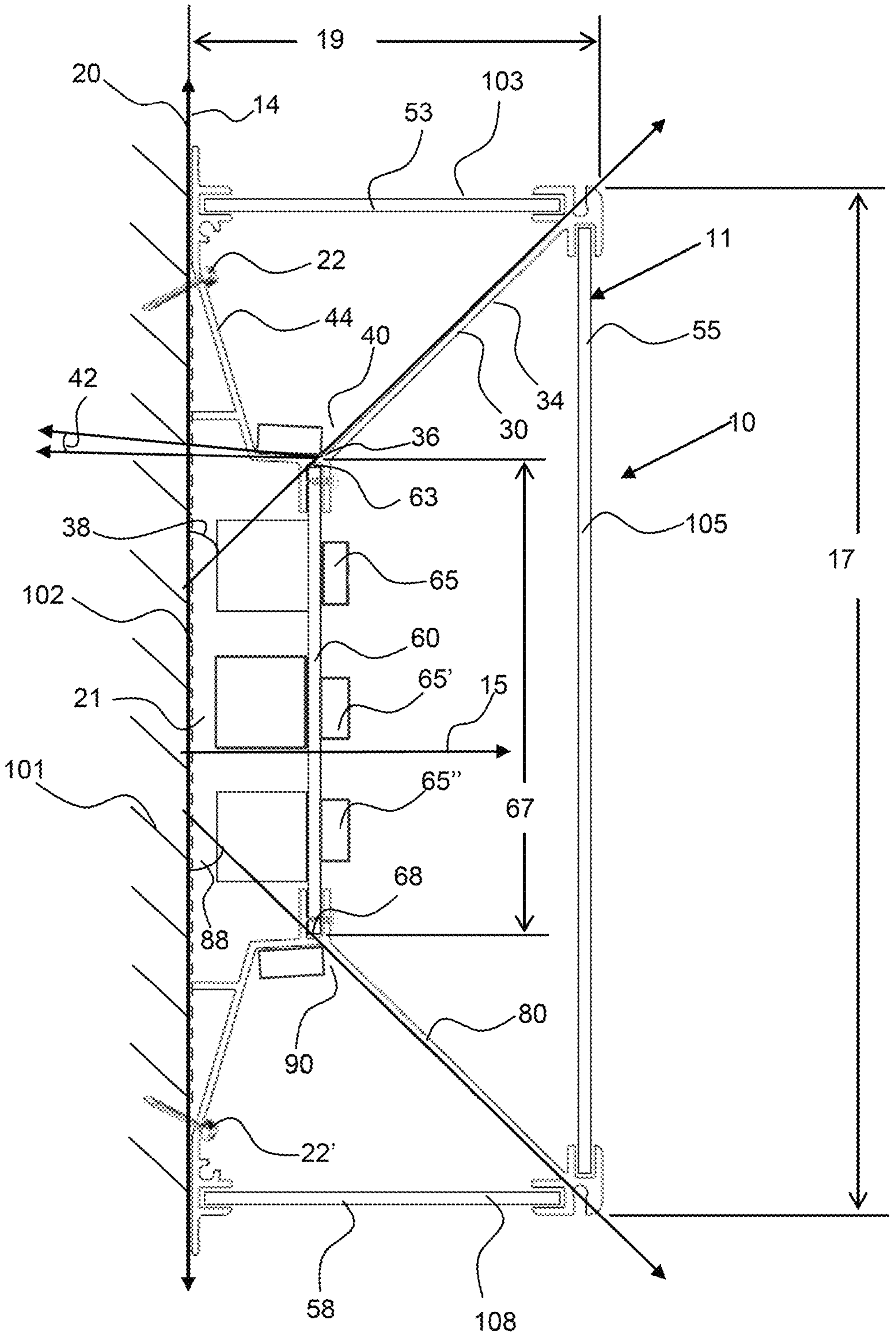
FIG. 2 shows the size adjustable LED light system of FIG. 1 coupled to a base by base retainers.
Figure 3:
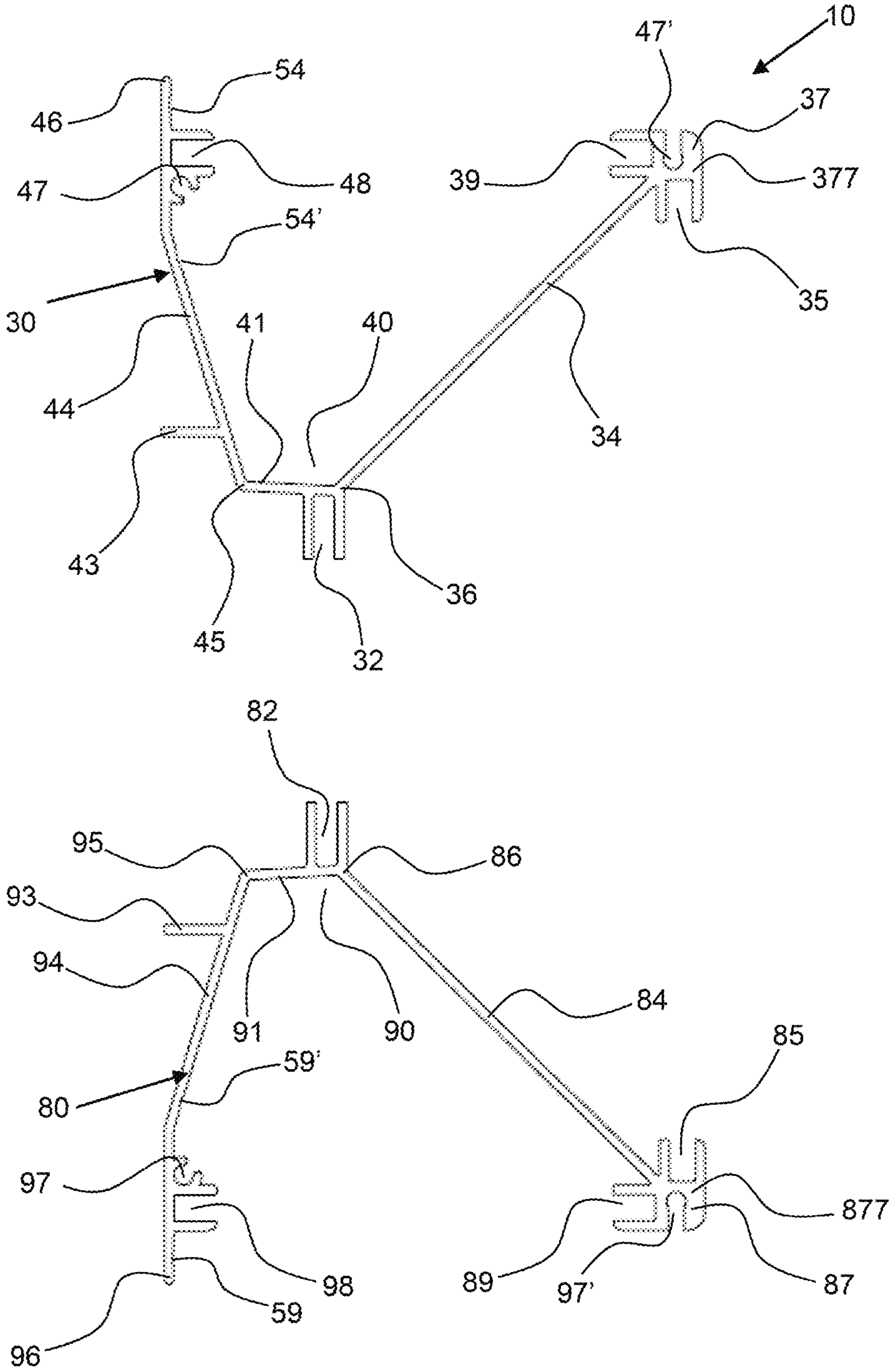
FIG. 3 shows a side view of the ends of a first light retainer and a second light retainer of the size adjustable LED light system.
Figure 4:
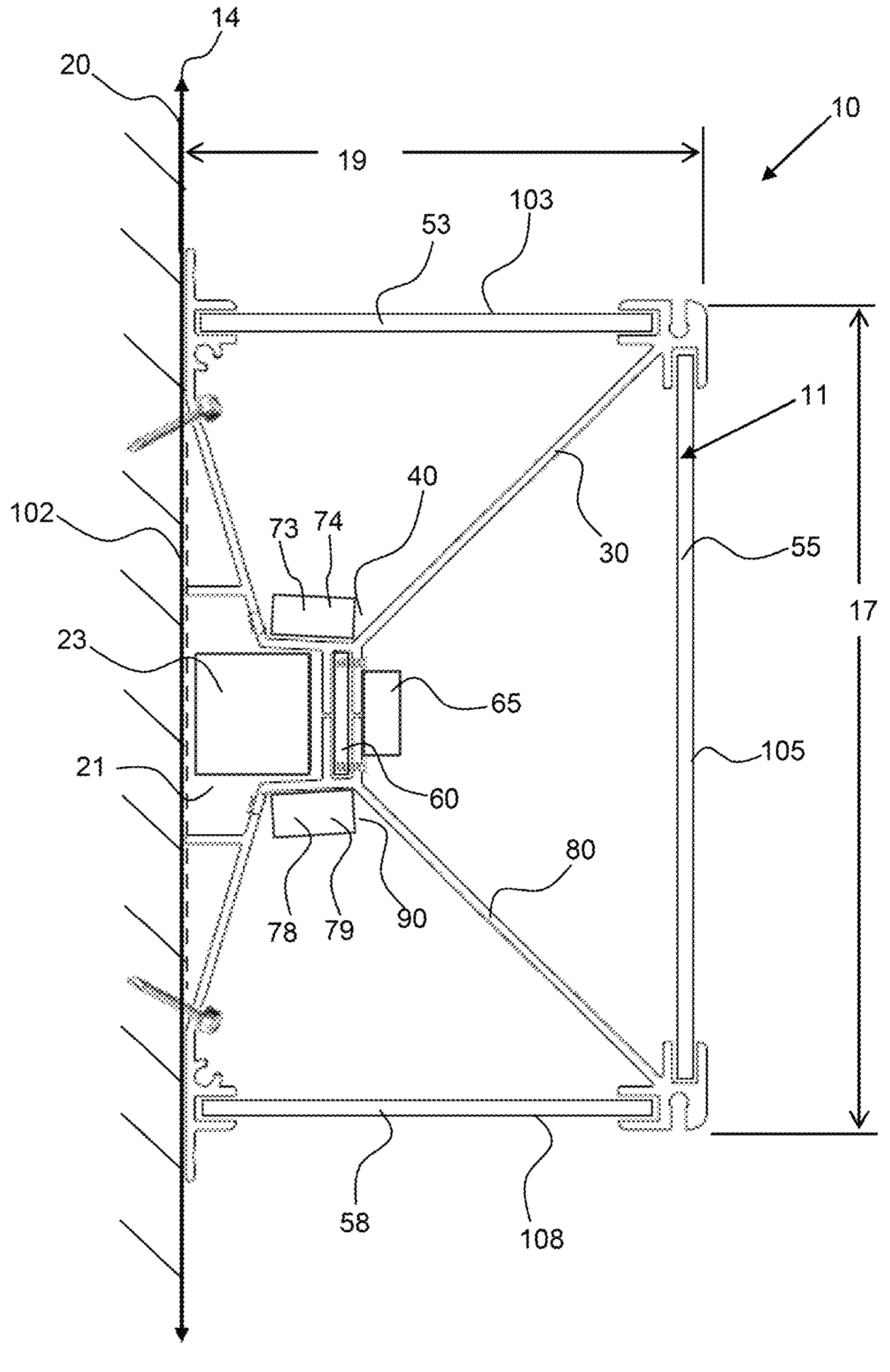
FIG. 4 shows a size adjustable LED light system with one LED light configured on the front LED light strip.

Referring now to FIGS. 1 to 6, a size adjustable LED light system 10 enables the assembly of a size adjustable LED light 11 that may be of different heights 17 as compared between FIGS. 2 and 4, wherein FIG. 2 is a size adjustable LED light 11 with a taller front LED light strip 60 and FIG. 4 is a size adjustable LED light 11 with a shorter front LED light strip 60. The height 67 of the front LED light strip 60 is shown in FIG. 2 and may include one or a plurality of LED lights between the first end 63 and the second end 68, which may be configured in rows extending along the length of the LED light strip. A size adjustable LED light 11 has a first light retainer 30 and a second light retainer 80 on opposing ends of a front LED light strip 60 to accommodate various height front LED light strips. The first light retainer has a front LED light strip channel 32 to retain the first end 63 of the front LED light strip 60 and the second light retainer 80 has a front LED light strip channel 82 to retain the second end 68 of the front LED light strip 60 Front LED retainer 26, 26', such as a screw couple the front LED light strip 60 withing the front LED light strip channels 32, 82, respectively. A wiring channel 21 is configured between the base extension 44, the front LED light strip 60 and a base side 102, such as a wall surface 101. Wiring 23, 25, and 28 extends between the base 20 and the front LED light strip 60 to provide power to the front LED lights 65, 65', 65", respectively.

The first light retainer 30 has a front extension 34 extending to an extended end 37 with a front panel channel 35 and a side panel channel 39. The front extension 34 extends from a connected end 36 to an extended end 37 and the front panel channel 35 and side panel channel 39 are configured proximal to the extended end or coupled with the extended end flange 377, an exposed strip extending along the length of the light retainer. The first light retainer has a base extension 44 extending to an extended end 46 with a side panel channel 48. A side LED light receiver channel 40 is configured between the front extension 34 and base extension 44 and has a channel extension 41 that has a planar surface for receiving a first side LED light 74 which may be coupled to a first side LED light strip 73. A channel extension 41 may extend between the front extension 34 and the base extension 44 at a channel extension offset angle 42 that angles a side LED light to project light forward or more toward the front light projection axis 15, extending normal from the base plane 14 along a centerline 16 between a first side 103 and second side 108 of the size adjustable LED light. The channel extension offset angle 42 may be offset from the front light projection axis about 5 degrees or more, 10 degrees or more, 15 degrees or more, and any range between and including the values provided. The channel extension offset angle prevents glare on the base or wall, and prevents hot spots. The front light projection axis is normal to the base plane as shown.

The front extension 34 has a connected end 36 and extends at an extension angle 38 from a base plane 14. The base extension has a connected end 45 and extends toward the base plane and may have a stand off 43 to support the first light retainer 30 up and away from the base 20 and to provide a space or channel for the wiring to extend between the base and the front LED light strip 60. The channel extension 41 may extend between the connected end 36 of the front extension 34 and the connected end 45 of the base extension 44.

The front LED light strip 60 is configured in the front LED light strip channels 32, 82 of the first light retainer 30 and second light retainer 80, respectively and front LED light 65 or lights project a front light through the front panel 55. A first side panel 53 extends between the side panel channel 48 of the base extension 44 and the side panel channel 39 of the front extension 34. The first side LED light 74 is configured to project light through the first side panel 53. A second side panel 58 extends between the side panel channel 98 of the base extension 94 and the side panel channel 89 of the front extension 84. The second side LED light 79 is configured to project light through the second side panel 58. Different color lights may be projected from the front and one or both of the sides of the size adjustable LED light 11.

The second light retainer 80 has a front extension 84 extending to an extended end 87 with a front panel channel 85 and a side panel channel 89. The front extension 84 extends from a connected end 86 to an extended end 87 and the front panel channel 85 and side panel channel 89 are configured proximal to the extended end or coupled with the extended end flange 877, an exposed strip extending along the length of the light retainer. The second light retainer has a base extension 94 extending to an extended end 96 with a side panel channel 98. The side panel channel 98 of the base extension and the side panel channel 89 of the front extension are alighted to receive a second side panel 58. A second side LED light receiver channel 90 is configured between the front extension 84 and base extension 94 and has a channel extension 91 that has a planar surface for receiving a second side LED light 79 which may be coupled to a second side LED light strip 78. The channel extension 91 may extend between the front extension 84 and the base extension 94. The front extension 84 has a connected end 86 and extends at an extension angle 88 from a base plane 14. The base extension 94 has a connected end 95 and extends toward the base plane and may have a stand off 93 to support the second light retainer 80 up and away from the base 20 and to provide a space or channel for the wiring to extend between the base and the front LED light strip 60. The channel extension 91 may extend between the connected end 86 of the front extension 84 and the connected end 95 of the base extension 94.

A second side panel 58 extends between the side panel channel 98 of the base extension 94 and the side panel channel 89 of the front extension 84. The second side LED light 79 is configured to project light through the second side panel 58.

The size adjustable LED light 11 is configured to project light in one, two or three planes or axes. The front LED light strip 60 projects light through the front panel 55 and along the front light projection axis 15 or plane. The first side LED light strip 73 and first side LED light 74 projects light through the first side panel 53 and along a first side projection axis 12 or plane. The second side LED light strip 78 and second side LED light 79 projects light through the second side panel 58 and along a second side projection axis 18 or plane. The first side projection axis and second side projection axis may be substantially orthogonal to the front light projection axis, or within about 10 degrees or less, or even within about 5 degrees or less of orthogonal. The first side projection axis 12 and second side projection axis 18 may be opposite each other, wherein light projected from the first side LED light 74 is directed in an opposite direction from the second side LED light 79. The first side LED light receiver channel 40 and the second side LED light channel 90 prevent the first side LED light from mixing with the second side LED light, as they are projected outward from the size adjustable LED light 11 in opposing directions.

As shown in FIG. 2, base retainers 22, 22', such as screws, are configured through the respective base extensions 44, 94 to secure the first light retainer 30 and the second light retainer 80 to the base 20 or wall surface 101, or more generally, to secure the size adjustable LED light 11 to a base 20. Also, front LED retainers 26, 26' secure the front LED light strip 60 in the respective front LED light strip channels 32, 82. As shown in FIG. 3, there are fastener-grooves 54, 54', 59, 59' in the respective base extension 44, 94 that retain and guide a fastener through the base extensions.

As shown in FIG. 3, the first light retainer 30 and the second light retainer 80 are geometrically the same and are configured as mirror images of each other to align the front LED light strip channel 32 of the first light retainer 30 with the front LED light strip channel 82 of the second light retainer 80. The width of the light retainer can be varied between the two front LED light strip channels.

Also shown in FIG. 3 are alignment grooves, such as alignment grooves 47, 47' in first light retainer and alignment grooves 97, 97' in the second light retainer 80 for assembly. A rod may be configured in the alignment groove or grooves to retain the light retainers in position during assembly. Also, a screw may be configured through an end plate and into the alignment groove for assembly.

As shown in FIG. 4, a front LED light strip 60 has a single front LED light 65. FIG. 4 shows a size adjustable LED light system with one LED light configured on the front LED light strip. Also, the height 17 and depth 19 of the size adjustable LED light 11 is shown in FIG. 4.

Figure 5:
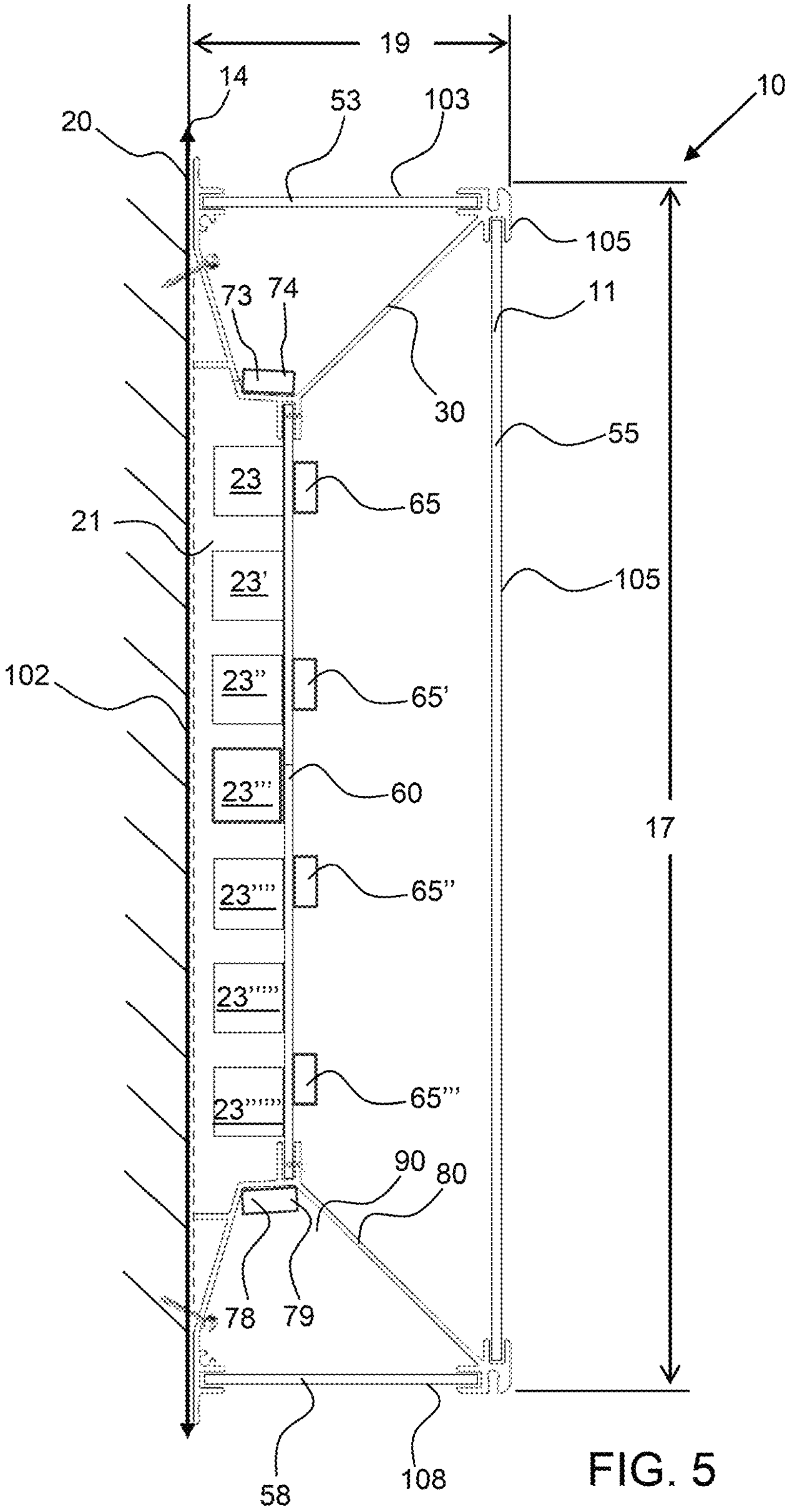
FIG. 5 shows a size adjustable LED light system with multiple LED lights configured on the front LED light strip.

As shown in FIG. 5, a front LED light strip 60 has a plurality of front LED lights 65, 65', 65", 65'" and wiring 23, 23', 23", 23", 23", 23", 23'" extending on a base side of the front LED light strip 60. Also, the height 17 and depth 19 of the size adjustable LED light 11 is shown in FIG. 5. The height is much larger than the height shown in FIG. 4, as the front LED light strip has a greater height than the front LED light strip shown in FIG. 4. The depth 19 of an exemplary size adjustable LED light 11 from a front side 105 to a base side 102 may be about 50 mm or more, about 75 mm or more about 100 mm or more, about 150 mm or more and any range between and including the depth values provided. The height 17 of an exemplary size adjustable LED light 11 may be about 50 mm or more, about 75 mm or more, about 100 mm or more, about 150 mm or more, about 200 mm or more, about 250 mm or more, about 300 mm or more, about 400 mm or more and any range between and including the height values provided. The height may be limited by the stiffness of the front panel, wherein a very thin front panel of about 4 mm or less may flex and pull out of the front panel channels. A thicker front panel of about 6 mm or more may be more rigid and therefore enable a size adjustable LED light 11 that has a greater height.

Figure 6:
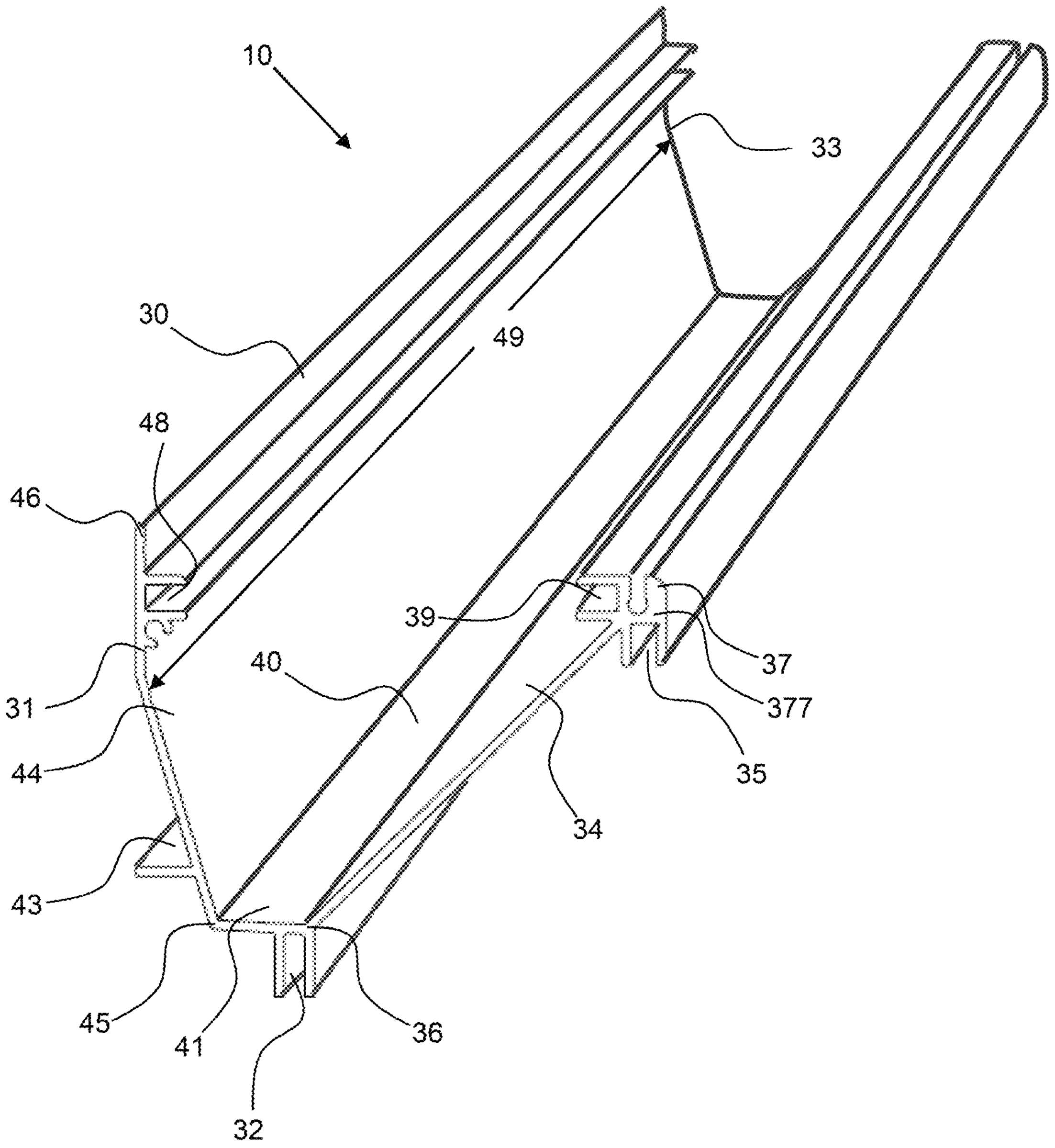
FIG. 6 shows a perspective view of a first light retainer of a size adjustable LED light system.

As shown in FIG. 6, the first light retainer 30 has a length 49 from a first end 31 to a second end 33. The first light retainer 30 and second light retainer (not shown) can be cut to a desired length to accommodate a front LED light strip of various lengths. The front extension 34 extends from a connected end 36 to an extended end 37 and the front panel channel 35 and side panel channel 39 are configured proximal to the extended end or coupled with the extended end flange 377, an exposed strip extending along the length of the light retainer.

Figure 7:
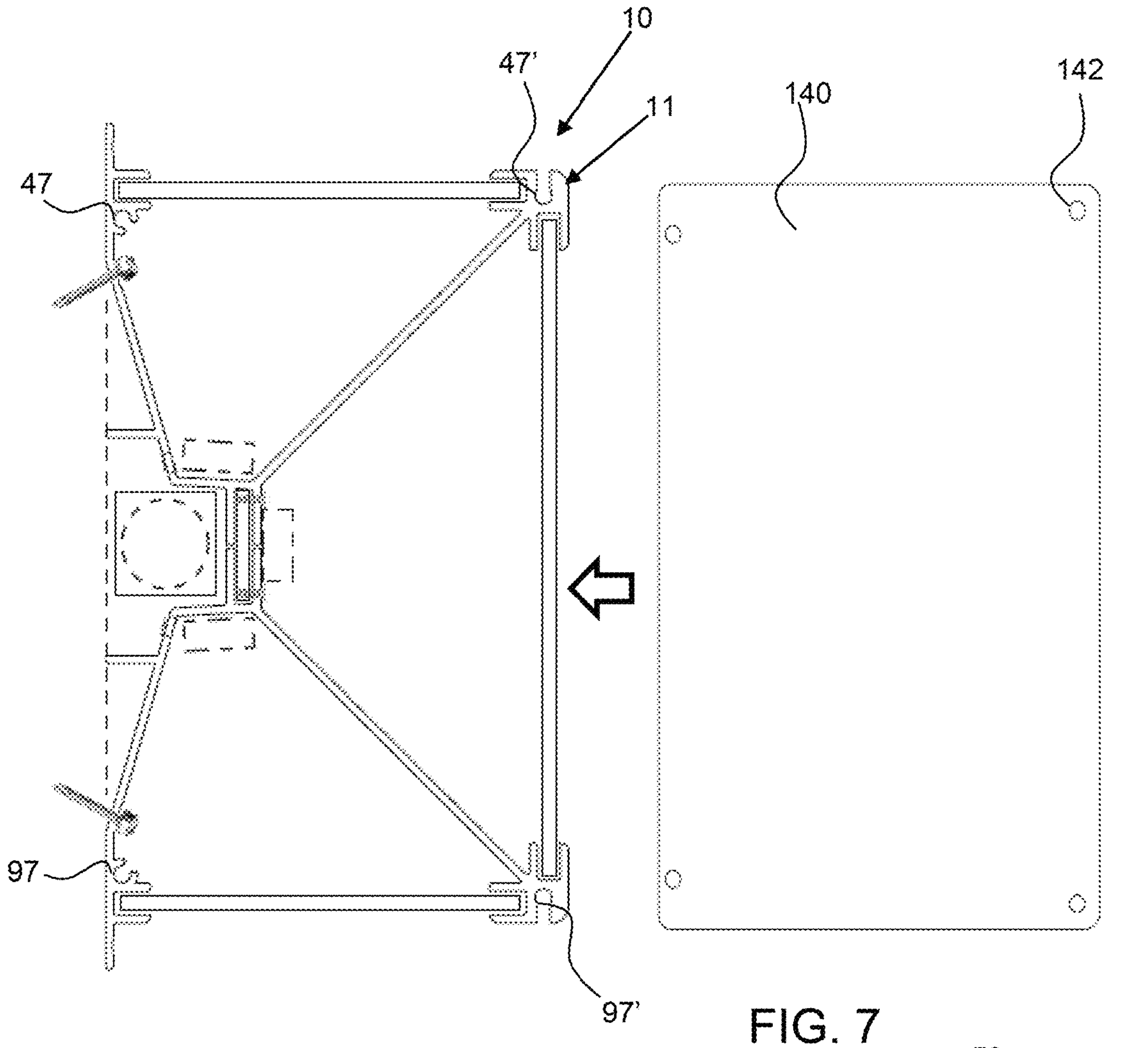
FIG. 7 shows a side view of a size adjustable LED light with an end plate 140 configured to attach to the end of the first and second light retainers.

As shown in FIG. 7, an end plate 140 is configured to attach to the end of the size adjustable LED light 11. The end plate has apertures 142 for a fastener to extend therethrough and into the alignment grooves 47, 47' of the first light retainer 30, and alignment grooves 97, 97' of the second light retainers 80.

Figure 8:
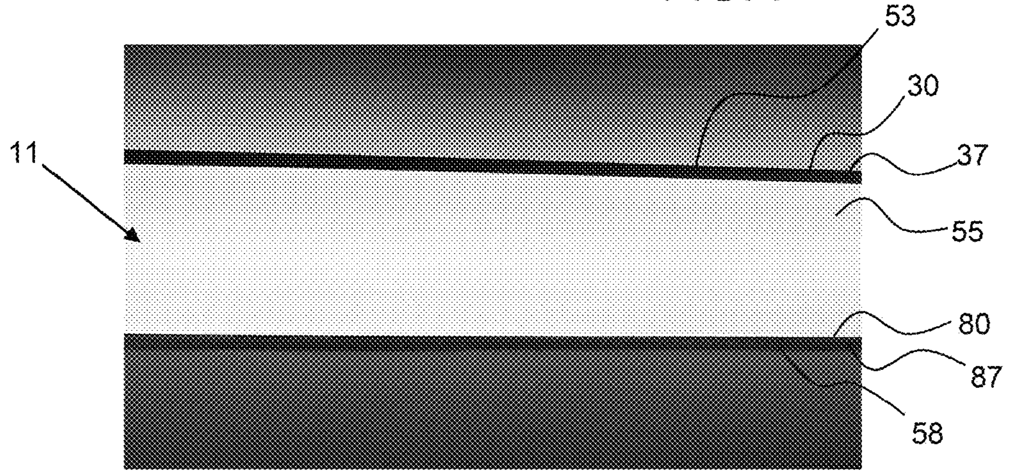
FIG. 8 shows a picture of a size adjustable LED light having a front LED light that produces a bright white light through the front panel, warm white light in the first side LED light receiver channel of the first light retainer and a second side LED light that produces a red light through the second side panel.

As shown in FIG. 8, an exemplary size adjustable LED light 11 has a front LED light strip that produces a bright white light through the front panel 55, a warm white light in the first side LED light receiver channel of the first light retainer 30, and a second side LED light in the second side LED light receiver channel of the second light retainers 80 that produces a red light from the second side light panel 58, of the size adjustable LED light 11. The first side light channel could have a first side LED light that produces a different color light from the second side or could have a first side panel that is pigmented a color to produce a different color from a white light first side LED light.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A size adjustable LED light system comprising:
   - a) a first light retainer and a second light retainer, each comprising:
     - i) a front LED strip channel;
     - ii) a front extension;
     - iii) a side panel,
     - iv) a side LED light receiver channel configured on an opposing side of the light retainer from the front LED strip channel;

wherein the front extension extends to an extended end and comprises a side panel channel and a front panel channel;
   - b) a front LED light strip, comprising a front LED light that is retained in and extends between the front LED strip channel of each of the first light retainer and the second light retainer;
   - c) a front panel extending between the front panel channel of the front extension of the first light retainer and the second light retainer and over the front LED light strip;

wherein light emitted from the front LED light is configured to project through the front panel;
   - d) a first side LED light strip, comprising a first side LED light, that is configured in a first side LED light receiver channel of the first light retainer and configured to emit light from said first side LED light receiver channel of said first light retainer;

wherein said side panel of the first light retainer extends between the side panel channel of the front extension of the first light retainer and over the first side LED light strip;

wherein light emitted from the first side LED light is configured to project through the side panel of the first light retainer;

wherein the first light retainer and second light retainer are configured to receive said front LED light strip and said front panel of different heights.

2. The size adjustable LED light system of claim 1, wherein the front panel and side panels are translucent.

3. The size adjustable LED light system of claim 2, wherein the front LED light of the front LED light strip and the first side LED light of the first side LED light strip are configured to emit different color light.

4. The size adjustable LED light system of claim 1, further comprising:

a) a second side LED light strip, comprising a second side LED configured to emit light from the second side LED light receiver channel of the second light retainer; and b) a second side panel extending between the side panel channel of the front extension of the second LED light retainer; and wherein light emitted from the second side LED light is configured to project through the second side panel.

5. The size adjustable LED light system of claim 4, wherein the second side panel is translucent.

6. The size adjustable LED light system of claim 5, wherein the front LED light of the front LED light strip, the first side LED light of the first side LED light strip, and the second LED light of the second LED light strip are configured to emit different color light.

7. The size adjustable LED light system of claim 6, wherein the first side LED light strip is flexible.

8. The size adjustable LED light system of claim 1, wherein the first light retainer and second light retainer are configured as mirror images of each other across a centerline.

9. The size adjustable LED light system of claim 1, wherein the first light retainer and second light retainer are each made of extruded plastic.

10. The size adjustable LED light system of claim 1, wherein the front LED light of the front LED light strip and the first side LED light of the first side LED light strip are configured to emit different color light.

11. The size adjustable LED light system of claim 1, wherein the front LED light of the front LED light strip and the first side LED light of the first side LED light strip emit light that is 1,500 lumens or more in brightness.

12. The size adjustable LED light system of claim 1, wherein the front LED light strip and the first side LED light strip each comprise a plurality of LED lights.

13. The size adjustable LED light system of claim 1, wherein the front extension of each of the first and second light retainers extend at an extension angle between 10 and 60 degrees.

14. The size adjustable LED light system of claim 1, wherein the front LED light strip has a plurality of front LED lights, with two or more configured between the front LED light strip channel of the first and second light retainers.

15. The size adjustable LED light system of claim 1, wherein the front LED light strip is rigid.

16. The size adjustable LED light system of claim 1, wherein the first light retainer and second light retainer are both monolithic parts.

17. The size adjustable LED light system of claim 1, wherein the first light retainer and second light retainer are flexible and wherein the size adjustable LED light extends in an arc between a first end and second end.

18. The size adjustable LED light system of claim 1, further comprising an endplate configured to detachably attach to an end of the first light retainer and the second light retainer.

19. The size adjustable LED light system of claim 1, wherein each of the first light retainer and the second light retainer further comprise an alignment groove.

* * * * *